Oct. 6, 1970        F. W. REILLY        3,532,369
CORNER CONSTRUCTION AND METHOD OF CONNECTING
RECTANGULAR FRAME MEMBERS TOGETHER
Filed Sept. 24, 1968        2 Sheets-Sheet 1
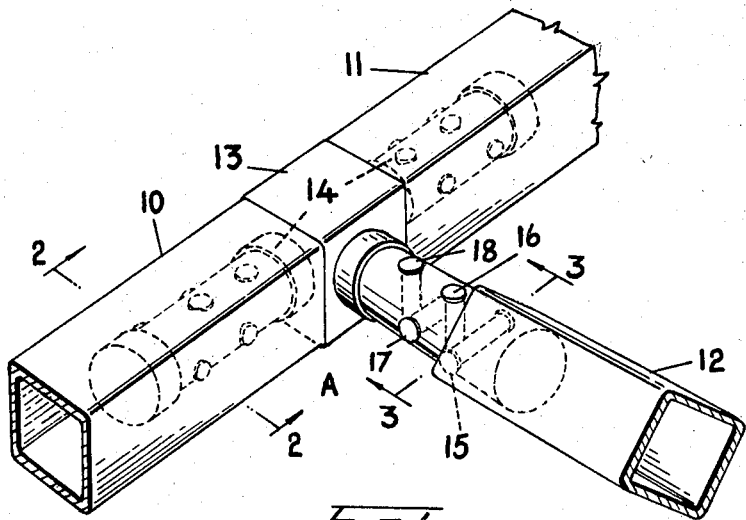
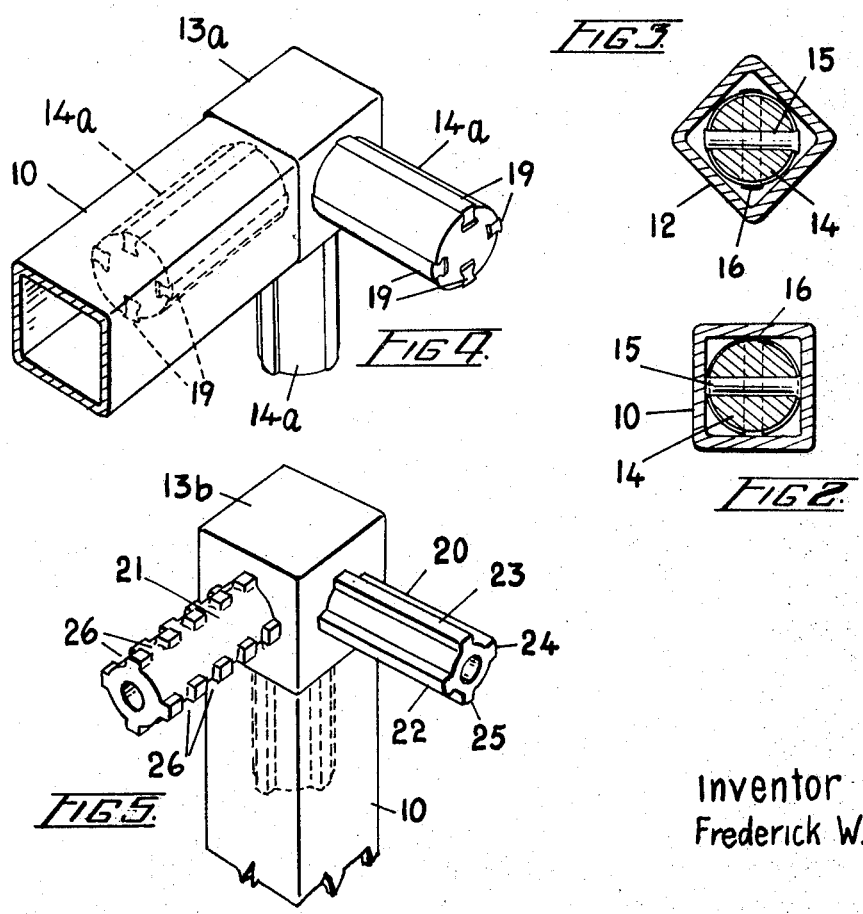
Inventor
Frederick W. Reilly

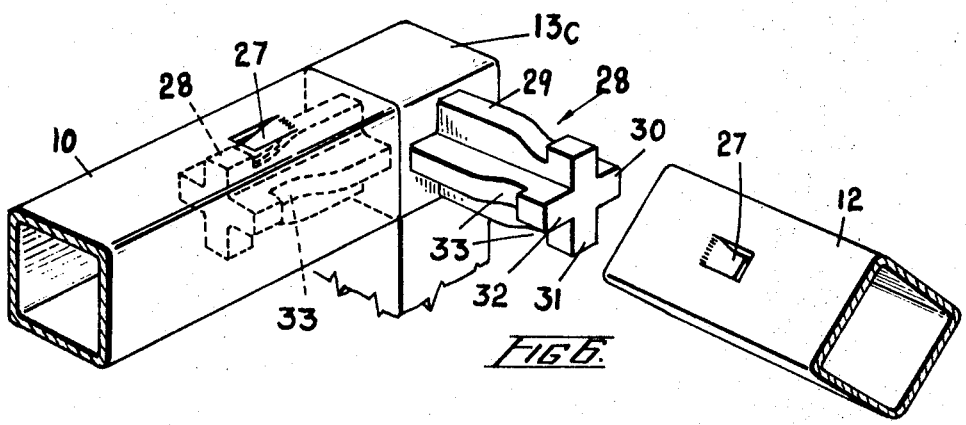
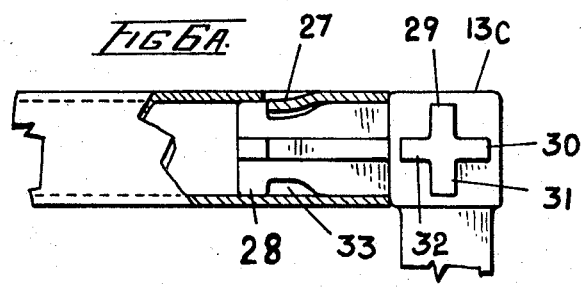
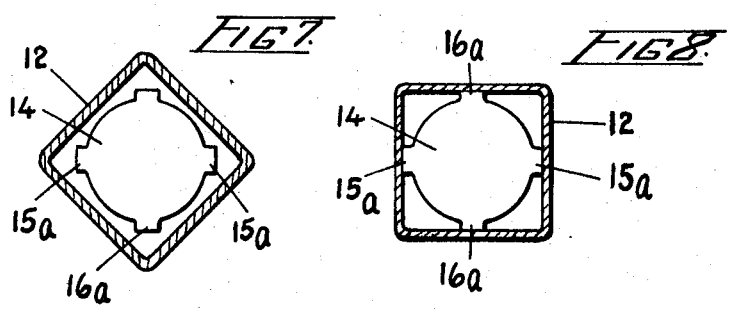
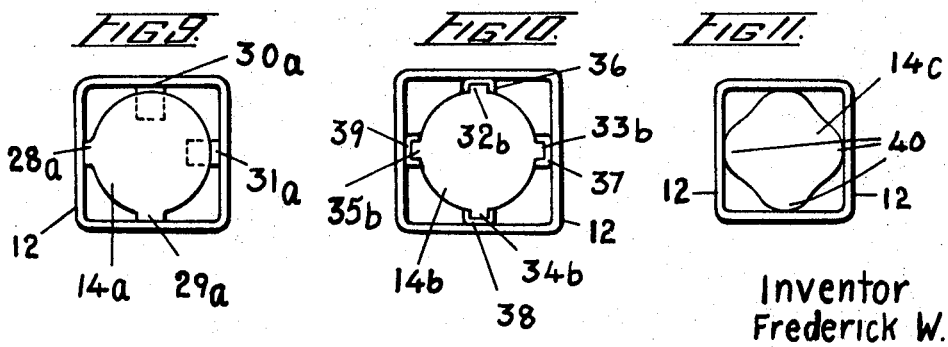

United States Patent Office 3,532,369
Patented Oct. 6, 1970

3,532,369
CORNER CONSTRUCTION AND METHOD OF CONNECTING RECTANGULAR FRAME MEMBERS TOGETHER
Frederick William Reilly, Islington, Ontario, Canada, assignor to Beautiline Limited, Weston, Ontario, Canada
Filed Sept. 24, 1968, Ser. No. 761,984
Int. Cl. E04g 7/00
U.S. Cl. 287—54                2 Claims

ABSTRACT OF THE DISCLOSURE

A connector for joining square or substantial square tubes in which the connector consists of a block which carries a plurality of posts, the posts being insertable into the tubes. The posts carry projections or enlargements which are resiliently compressible. The overall diameter of each post is less than the diameter across the diagonals of the tube and slightly greater than the inside across the short diameters of the tubular member into which it is to fit. The connection is made by orienting the projections with the angles of the tubular member, inserting the post and then by axial rotation an interference fit is obtained which releasably locks the post in the tubular member.

BACKGROUND OF THE INVENTION

Knockdown units are in common use using some method for prefabricating the various elements by mass production methods and then shipping the parts to the user, in knockdown state. One successful method of connecting the parts together is described in my U.S. Pat. No. 3,276,832 dated Oct. 4, 1966.

Another means for connecting the elements together is described and shown in Canadian Pat. No. 728,354 dated Feb. 22, 1966 to David H. Peacock. This structure has, amongst others, a main disadvantage namely the sleeve which fits inside the tube and is a three part system. It is also expensive to manufacture and difficult to assemble as compared to the present invention.

Others methods of assembling tubular members have required the tube to be drilled and a side locking screw gives the needed rigidity.

Other methods of assembling tubular constructional members have centered on miter joints permanently joining the abutting members by welding.

OUTLINE OF THE INVENTION

The disadvantages of the foregoing constructional systems are met by the connector of the present invention. As herein described, the connector is a two part system and is freely inserted into the tubular member and thereafter removably secured therein by an axial turn to give a rigid joint suitable for normal use. A reverse movement accomplishes an unlocking to permit dismantling the structure.

The connector of the present invention for joining tubular members of substantially square cross section comprises a rectangular block having its cross section conformed to the cross section of the tubular members, at least two posts formed integrally with said block, one of each of said posts extending outwardly from and at right angles to a different face of said block, each post having diametrically opposite projections spaced at 90° intervals around the periphery of the posts, at least two of the projections being resiliently compressible, the total diameter of the post and the projections being less than the length of the diagonals of the tubular members and slightly greater than the perpendicular distance between opposite faces of the tubular member whereby when the projections are oriented with the angles of the tubular member the post can be fitted into the tubular member and after insertion, relative axial rotation of the tubular member and the post will effect an interference fit between the projections and the inside of the tubular member thereby releasably locking them together.

DESCRIPTION OF THE INVENTION

The invention is described in the following disclosure which is illustrated by the accompanying drawings in which:

FIG. 1 shows tubular member connected together by the connector and also in the process of being connected.

FIG. 2 is a cross section on the line 2—2 of FIG. 1.

FIG. 3 is a cross section on the line 3—3 of FIG. 1.

FIG. 4 illustrates a modification of the connector shown in FIG. 1.

FIG. 5 illustrates further modifications.

FIG. 6 illustrates a further modification in which a locking detent is employed.

FIG. 6a is an elevation of the modification of FIG. 6 with a part of the tubular member broken away to show the connector.

FIGS. 7 and 8 diagrammatically illustrate the two positions of application of connector to tube.

FIGS. 9, 10 and 11 illustrate further modifications of the connector.

The connector illustrated in FIGS. 1, 2 and 3 comprises tubular frame members 10, 11 and 12, the member 12 being in the initial position for connection, the tubular member 10 in the final stages of connection and the tubular member 11 in its final position of being connected to the connector.

The tubular members are each substantially square in cross section but some variations are permissible. For example, two opposite sides may be 1" in length while the other two opposite sides may be 1⅛" in width.

The connector A comprises a substantially cube shaped block 13 which has its cross section conformed to the cross section of the tubular members and a plurality of posts 14, the number of the posts depending on the number of tubular members which are to be connected together by a single connector A. In the modification shown in FIG. 1, three such posts are shown whereby it is possible to connect the frame members 10, 11 and 12 together. It is preferable that the block and the posts be formed integrally in the same casting or molding operation and they preferably should be made of material which has some resilience so that they are not readily broken or fractured.

Each post is provided with at least two resilient projections, the projections being also characterized by compressibility. In FIG. 1 the projections take the form of a plurality of resilient, compressible inserts 15, 16, 17, 18 entered diametrically through the post 14 and have their projecting ends extending slightly above the periphery of the post 14. It will be seen that the inserts 16 and 18 are disposed at right angles to the inserts 15, 17. The total diameter of the posts and the length of the projections are less than the length of the diagonals of the tubular members and slightly greater than the perpendicular distance between opposite faces of the tubular member whereby when the projections are oriented with the angles of the tubular member (see tubular members 10 and 12, FIG. 1) the posts can be fitted into the tubular member and after insertion relative axial rotation of the tubular member and the post through approximately 45° will effect an interference fit between the projections and the inside of the tubular member thereby releasably locking them together. To separate the tubular member from its connector, the reverse movement is undertaken.

FIG. 4 illustrates a modified connector which has the same characteristics as the previously described connector. The connector comprises a block 13a which carries posts 14a. Each post 14a is provided with four diametrically opposite grooves in the periphery thereof, the grooves being spaced at intervals of 90° and each groove carries a resilient compressible strip 19 which projects far enough above the surface of the post to provide the dimensions previously mentioned. FIG. 5 illustrates another modification of the connector comprising block 13b having posts 20, 21 of different profile to show two types of posts although in practice the post constructions would be uniform. In the illustrated embodiment, the post 20 has longitudinally extending projections 22, 23, 24 and 25 which serve the same purpose as the inserts 15 to 19, inclusive. The post 20 and its projections 22, 23, 24 and 25 are formed integrally of compressible resilient material, it being desirable that the material be of the kind which has a "memory." The post 21 is similar to the post 20 with the exception that the projections are serrated as indicated at 26.

FIG. 6 illustrates still another construction of the connector including a lock which secures the connector and tube together. In this embodiment, the connector comprises a block 13c having a plurality of posts 28 projecting outwardly at right angles to the relevant post face. Each post includes four radial arms 29, 30, 31, 32 at 90° intervals each arm being formed with a recess 33 spaced inwardly from the free end thereof. The tube 10 is formed with an inwardly extending detent 27, in the present case by stamping it out of the material of one of the sides of the tube. The detent 27 is positioned so that it will engage in the recess 33 when the post 28 is inserted into the tube 10. The detent 26 does not interfere with the assembly of the post and the tube since, as will be seen from the drawings, the projection will travel between a pair of projections and then, when the tube is rotated, will be brought into position in the recess 33. This provides a locked joint to prevent relative longitudinal slippage between the projections and the tube. This prevents disconnection due to accident or vibration.

FIG. 7 and 8 illustrate, respectively, the unlocked and locked positions of the post or connector 14 in the tubular member 12. The post 14 is provided with a pair of diametrically opposed, longitudinally extending projections 15a, 15a and 16a, 16a. In the locked position as shown in FIG. 8 each pair of projections 15a, 15a and 16, 16 is clamped between opposite walls of the square tubular member 12.

FIG. 9 diagrammatically illustrates a structure in which the post 14a is provided with two fixed projections 28a, 29a, spaced at 90° intervals and two plastic inserts 30a, 31a diametrically opposite the fixed projections 28a, 29a respectively.

The modification illustrated in FIG. 10 shows a post 14b provided with four oppositely disposed projections 32b, 33b, 34b, 35b, each of which carries a resilient compressible plastic cap 36, 37, 38 and 39.

FIG. 11 illustrates a further modification wherein the post 14c is formed with four diametrically opposite cam lobes 40 spaced 90° apart. In this case, it is preferable that the post and lobes be made of nylon or metal of a character which is resilient and slightly compressible.

In each modification that is illustrated and also other modifications which a person skilled in the art may adopt within the ambit of the claims the post and the projections have a cross sectional width less than the diagonals of the tubular members and slightly greater than the perpendicular distance between opposite faces of the tubular member so that when the projections are oriented with the angles of the tubular member the posts can be fitted into the tubular member and after insertion by axial rotation of the post within the tubular member there will be an interference fit between the projections and the inside of the tubular member thereby releasably locking them together.

One of the advantages of the present invention is that it permits the use of commercial tubular forms which may have a tolerance of ±0.020 in its inside dimensions.

What I claim is:
1. A connector for joining substantially square metallic tubular members comprising:
   a six-sided cubical block, the dimensions of each side corresponding to the square end of the tubular member;
   at least two posts formed integrally with the said block, each post projecting outwardly from a different side of the block and perpendicular to its respective side;
   each post having four diametrically opposite resiliently-compressible inserts therein forming radial projections extending substantially the full length of the post and spaced intervals around the periphery of the post, the total diameter of the post as measured across a pair of opposed projections being less than the length of the diagonal distance between a pair of diametrically opposed corners of the tubular members and slightly greater than the perpendicular distance between opposite faces of the tubular members;
whereby, when the projections are oriented with the corners of the tubular member the post can be fitted into the tubular member and after insertion, relative axial rotation of the tubular member and the post will effect an interference fit between the projections and the inside faces of the tubular member thereby releasably locking them together without deforming the tube.

2. A connector according to claim 1 in which each insert is mounted in an insert receiving groove formed longitudinally in the post at the said 90° intervals.

References Cited

UNITED STATES PATENTS

| | | | |
|---|---|---|---|
| 2,949,692 | 8/1960 | Kuhn. | |
| 3,004,784 | 10/1961 | Selby | 287—2 |
| 3,074,203 | 1/1963 | Paksy | 287—2 XR |
| 3,232,160 | 2/1966 | Fork et al. | 287—127 XR |

FOREIGN PATENTS

| | | |
|---|---|---|
| 895,091 | 3/1944 | France. |
| 246,854 | 9/1963 | Australia. |
| 1,011,688 | 12/1965 | Great Britain. |
| 1,471,179 | 11/1967 | France. |
| 1,496,182 | 1967 | France. |
| 454,555 | 7/1968 | Switzerland. |

DAVID J. WILLIAMOWSKY, Primary Examiner

A. V. KUNDRAT, Assistant Examiner

U.S. Cl. X.R.

287—127